(12) United States Patent
Zhou et al.

(10) Patent No.: US 11,567,894 B1
(45) Date of Patent: Jan. 31, 2023

(54) CONCURRENT TRANSMISSION OF AUDIO AND ULTRASOUND

(71) Applicant: Amazon Technologies, Inc., Seattle, WA (US)

(72) Inventors: Xiang Zhou, Santa Clara, CA (US); Hao Chen, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 16/821,353

(22) Filed: Mar. 17, 2020

(51) Int. Cl.
*G06F 13/42* (2006.01)
*G06F 3/16* (2006.01)
*G05B 19/042* (2006.01)

(52) U.S. Cl.
CPC ..... *G06F 13/4291* (2013.01); *G05B 19/0423* (2013.01); *G06F 3/162* (2013.01); *G06F 3/165* (2013.01); *G06F 2213/0016* (2013.01)

(58) Field of Classification Search
None
See application file for complete search history.

(56) References Cited

U.S. PATENT DOCUMENTS

| 7,885,422 | B2 * | 2/2011 | Sinai | H04M 1/6066 381/119 |
| 9,461,707 | B1 * | 10/2016 | Virden | H04L 25/4902 |
| 9,877,132 | B2 * | 1/2018 | Engdegard | H04H 40/45 |
| 10,200,794 | B2 * | 2/2019 | Oliaei | H04R 3/06 |
| 10,708,701 | B2 * | 7/2020 | Skovenborg | H04R 29/007 |
| 2007/0124150 | A1 * | 5/2007 | Sinai | G06F 3/162 704/500 |
| 2008/0143885 | A1 * | 6/2008 | Camp | H04N 5/40 348/724 |
| 2011/0063409 | A1 * | 3/2011 | Hannuksela | H04N 19/46 348/E13.001 |
| 2011/0124300 | A1 * | 5/2011 | Sinai | H04M 1/6066 381/119 |

OTHER PUBLICATIONS

"I2S Bus Specification," Philips Semiconductors, Feb. 1986, Revised Jun. 5, 1996, 7 pages.

* cited by examiner

*Primary Examiner* — Henry Tsai
*Assistant Examiner* — Christopher A Bartels
(74) *Attorney, Agent, or Firm* — Kilpatrick Townsend & Stockton LLP

(57) ABSTRACT

Techniques for concurrent transmission of audio and ultrasound are described. In an example, a computing device generates, in a digital domain, mixed audio data from multiple sets of audio data, each set corresponding to a different audio channel. The computing device also generates, in the digital domain, ultrasound data, and generates serial data by providing the mixed audio data and the ultrasound data as different inputs to an I2S mixing module. In an analog domain, the computing device generates an output signal based at least in part on the serial data, and sends the output signal to a speaker.

20 Claims, 9 Drawing Sheets

CONCURRENT TRANSMISSION OF AUDIO AND ULTRASOUND

BACKGROUND

A computing device can support multiple functionalities via one or more user interfaces. A voice user interface (VUI) can receive speech input for an operation, play a response to the speech input, and play an output of executing the operation. For instance, the speech input may corresponds to a request to play audio and the execution of the operation may result in streaming the audio from an audio source. Supporting different functionalities can necessitate specific hardware and software configurations of the computing device and specific power management of a power source of the computing device.

BRIEF DESCRIPTION OF THE DRAWINGS

Various embodiments in accordance with the present disclosure will be described with reference to the drawings, in which.

DETAILED DESCRIPTION

Figure 1:
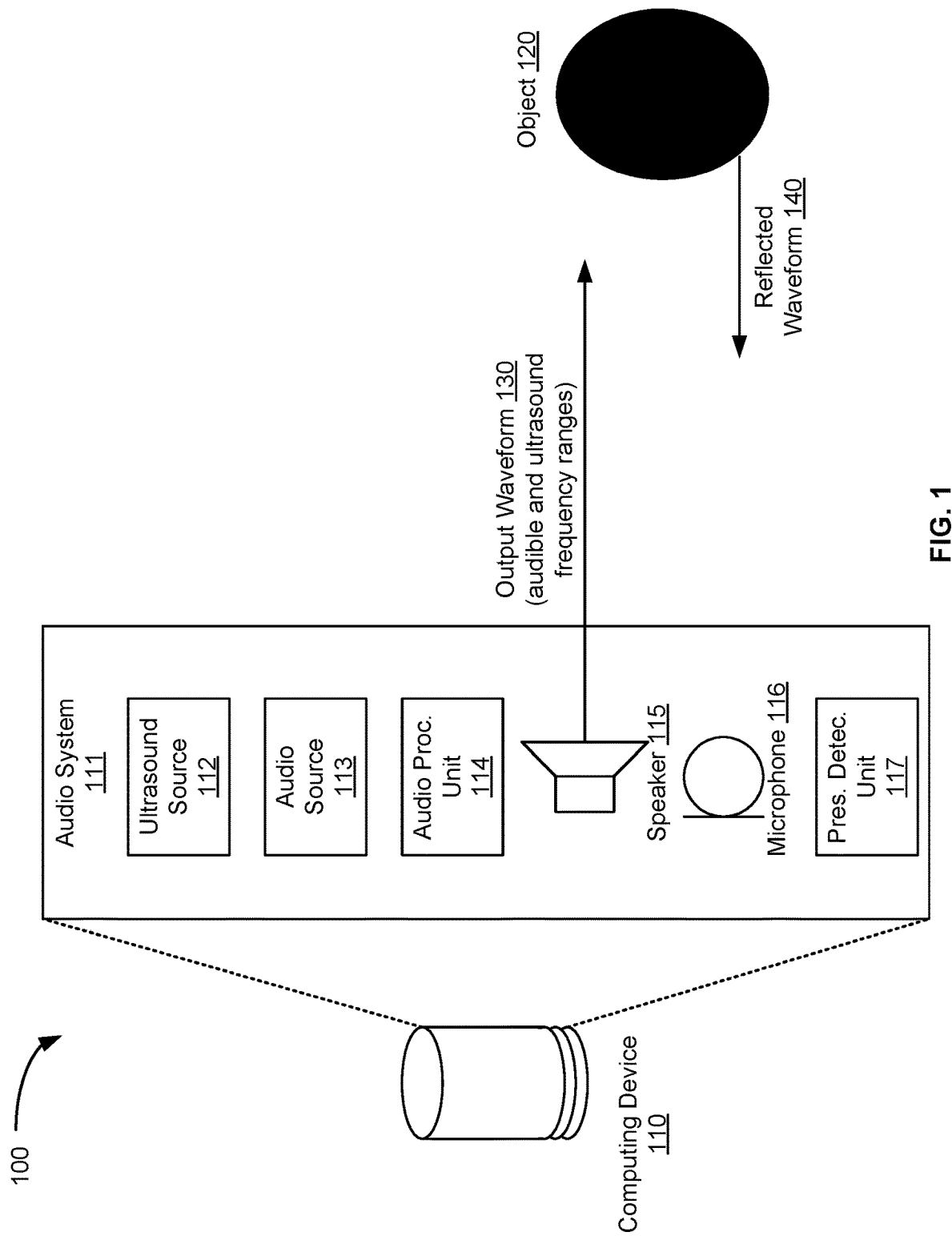
FIG. 1 illustrates an example of an environment where a computing device transmits an audio signal and an ultrasound signal concurrently and uses the ultrasound signal for presence detection, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, concurrent transmission of audio and ultrasound signals. Audio represents audible sound to humans, where the audible sound has a frequency band in an audio frequency range of about 20 to 20,000 Hz. Ultrasound represents sound that is inaudible to humans, where the inaudible sound has a frequency band in an audio frequency range starting at about 20,000 Hz and extending to multiple megahertz. In an example, a computing device can output the audio signal in support of a first functionality of the computing device (e.g., streaming audio) and can output the ultrasound signal in support of a second functionality of the computing device (e.g., user presence detection). Different approaches are possible to concurrently output the audio signal and the ultrasound signal to support the different functionalities. A first approach can involve separate and dedicated sets of hardware and software, one set for the audio signal and one set for the ultrasound signal. A drawback of such an approach is the added circuitry, a larger device footprint, and possibly increased power consumption. A second approach can involve re-using the same set of hardware and software for the processing and transmission of both the audio signal and the ultrasound signal. This approach generally avoids the need for added circuitry and supports a smaller device footprint. However, power consumptions and gain level of the ultrasound signal can be constrained depending on the processing architecture.

Embodiments of the present disclosure use the second approach, while meeting device power constraints and ultrasound gain level targets. In an example, a computing device receives sets of audio data in the digital domain, where each set corresponds to an audio channel. The computing device combines the sets of audio data to generate mixed audio data in the digital domain. The computing device also generates ultrasound data in the digital domain. The mixed audio data is input on a first audio channel to an I2S mixing module of the computing device. The ultrasound data is input on a second audio channel to the I2S mixing module. The I2S mixing module implements an I2S standard defining a serial bus interface used for mixing input audio channels. The output of the I2S mixing module includes serial data that interleaves bits of the mixed audio data and bits of the ultrasound data. The computing device generates, in the analog domain, an output signal based on the serial data. The output signal superimposes a mixed audio signal corresponding to the mixed audio data and an ultrasound signal corresponding to the ultrasound data. The output signal can be sent to a speaker for presentation.

To illustrate, consider a use case of a voice-controlled device. The voice-controlled device can receive speech input and, in response, perform multiple operations including playing music via a speaker. The voice-controlled device can also rely on an ultrasound signal transmitted via the speaker to perform other operations, such as to the detect the presence of the user (e.g., based on a reflection of the ultrasound signal) and automatically play the music or increase the loudness of the music upon such a detection. In this case, an audio source of the voice-controlled device can output stereo audio data corresponding to the music. The stereo audio data includes left audio data and right audio data. A digital mixer of the computing device can mix the left audio data and the right audio data to output mixed audio data to an I2S mixing module of the voice-controlled device via a first stereo channel (e.g., the right audio channel). An ultrasound generator of the voice-controlled device can generate and output ultrasound data at a full digital scale to the I2S mixing module via a second stereo channel (e.g., the left audio channel). The I2S mixing module generates serial data by multiplexing the mixed audio data and the ultrasound data according to a bit clock (BCLK) and a word clock (WCLK) that define a timing diagram. The serial data is output to an I2S encoder-decoder (codec) that then generates, in the analog domain, a mixed audio signal and an ultrasound signal. Each of the mixed audio signal and ultrasound signal are amplified separately and the two amplified analog signals are mixed together by an analog mixer of the voice-controlled device to generate an output signal. The output signal is then played by the speaker and includes a superimposition of the ultrasound signal and the mixed audio signal, for example, the superimposition of the ultrasound signal over the mixed audio signal.

Embodiments of the present disclosure provide various improvements. In particular, the ultrasound data can be processed at the full digital scale in the digital domain, while also meeting any power constraint due to the voltage rail of the computing device. Accordingly, the amplitude of the resulting ultrasound signal can be large, resulting in a large distance range of the ultrasound signal. In addition, the ultrasound signal can be further amplified in the analog domain to further extend the distance range.

In the interest of clarity of explanation, embodiments of the present disclosure are described in connection with stereo audio data and stereo audio channels. However, the embodiments are not limited as such and can similarly apply to sets of audio data, where each set corresponds to a different audio channel. In particular, three or more sets of audio data can be used. In addition, the I2S mixing module may receive two or more inputs that can be mixed to output serial data. For instance, in the case of surround sound 5.1, six different sets are used, each set corresponding to one of six audio channels. In this case, the six sets can be mixed into a single set of audio data and output to an I2S mixing module over a single audio channel. Another input of the I2S is ultrasound audio sent over a separate audio channel. Alternatively, the six sets can be mixed into two subsets of audio data (e.g., each subset combines three different sets of the surround sound) and are output to an I2S mixing module over two audio channels. In this example, a third input of the I2S is ultrasound audio sent over a third audio channel.

FIG. 1 illustrates an example of an environment 100 where a computing device 110 transmits an audio signal and an ultrasound signal concurrently and uses the ultrasound signal for presence detection, according to embodiments of the present disclosure. In an example, the computing device 110 mixes stereo audio data to generate mixed audio data and further mixes the mixed audio data with ultrasound data to generate serial data in the digital domain. In the analog domain, the computing device 110 converts the serial data into a mixed audio signal and an ultrasound signal and mixes the audio signal and the ultrasound signal to generate an output signal.

In an example, the computing device 110 includes an audio system 111 that generates the output signal. The audio system 111 includes multiple components, each implemented as hardware, software, or a combination of hardware and software. Among these components are an ultrasound source 112, an audio source 113, an audio processing unit 114, a speaker 115, a microphone 116, and a presence detection unit 117.

The ultrasound source 112 generates ultrasound data in the digital domain. The ultrasound data can correspond to an ultrasound tone, an ultrasound chirp, or other types of ultrasound signal formats.

The audio source 113 generates stereo audio data that includes left audio data and right audio data. The stereo data can be generated from local digital files (e.g., music files having a stereo format and stored in local memory of the computing device 110). The stereo data can also be generated based on streaming audio from a remote content source over a data network.

The audio processing unit 114 can implement the I2S standard and can generate an output signal, in the analog domain, based on the mixed audio data and the ultrasound data. Implementations and operations of the audio processing unit 114 are further described in connection with the next figures.

The output signal can be an analog signal, such as an electrical signal that carries audio components and ultrasound components. The speaker 115 can receive and present the output signal as an output waveform 130, such as acoustic waves that are transmitted through the air. The acoustic waves can include waves in the audible frequency range (e.g., 20 Hz to 20,000 Hz) corresponding to the audio signal and waves in the ultrasound frequency range (e.g., larger than 20,000 Hz) corresponding to the ultrasound signal.

The transmitted ultrasound waves (e.g., the acoustic waves in the ultrasound frequency range) have a known frequency band to the audio system 111. Upon reaching an object 120, such as a user, the ultrasound waves can be reflected. The reflected acoustic waves are illustrated in FIG. 1 as a reflected waveform 140.

The microphone 116 detects the reflected waveform 140 and generates a detected signal, such as an electrical signal. The detected signal can be sent to the presence detection unit 117. In turn, the presence detection unit 117 detects the presence of the object 120. Different techniques are possible to detect the presence. In one example technique, the frequency band of the transmitted acoustic waves is known to the presence detection unit 117. Movement of the object 120 causes a shift in the frequency band corresponding to a Doppler effect. The presence detection unit 117 detects the presence given the frequency shift relative to the known frequency band.

The computing device 110 can use the audio and the ultrasound signals for different functionalities. For instance, the audio signal supports an audio play functionality over the speaker 115, such as to play or stream music to a user. The ultrasound signal supports the detection of the presence of such a user, or other objects. The audio play functionality and the user presence detection functionality can be operated separately from each other or in conjunction with each other. For instance, upon the detection of the presence of a user (e.g., movement of the object 120 indicates the presence), the volume of the audio being played on the speaker 115 can be adjusted (e.g., increased or decreased) in accordance with the presence of the user.

Generally, the computing device 110 represents a user device that provides different functionalities to a user via one or more user interfaces. For instance, the computing device 110 can be a voice-controlled device that includes only a voice user interface, a voice-controlled device that includes a voice user interface and a graphical user interface, a mobile device, a smart speaker, smart headphones, a smart television, a smart appliance, or any other internet of things (IoT) device. The computing device 110 includes, in addition to the audio system 111, one or more processors and one or memories storing computer-readable instructions that are executable by the one or more processors to perform the various functionalities.

Given that the audio and the ultrasound signals are presented via the same speaker 115 and their uses support different functionalities, various challenges exist. For example, the audio signal needs to be played at a loud enough volume such that a user can hear and enjoy the played audio. Further, the ultrasound signal needs to be played at a loud volume (although not audible to the user) such that the user presence detection range is large enough to detect the user at a particular distance away from the computing device 110. Because the same speaker 115 is being used for the transmission of both the audio and ultrasound signals, the impedance of the speaker's 115 transducer is high at the ultrasound range. High impedance could necessitate high power to meet a target detection range for the user presence detection range. In turn, high power would necessitate high power consumption, which may be a drawback when the computing device 110 is battery powered (e.g., in the case of a mobile computing device). Additionally or alternatively, the available power can be constrained by a voltage rail of the computing device 110, thereby limiting the user presence detection range. As further described in connection with the next figures, embodiments of the present disclosure can maximize the user presence detection range while meeting the power constraint, while using the same audio system 111 including the speaker 115 for both the audio signal and ultrasound signal processing and transmission.

Figure 2:
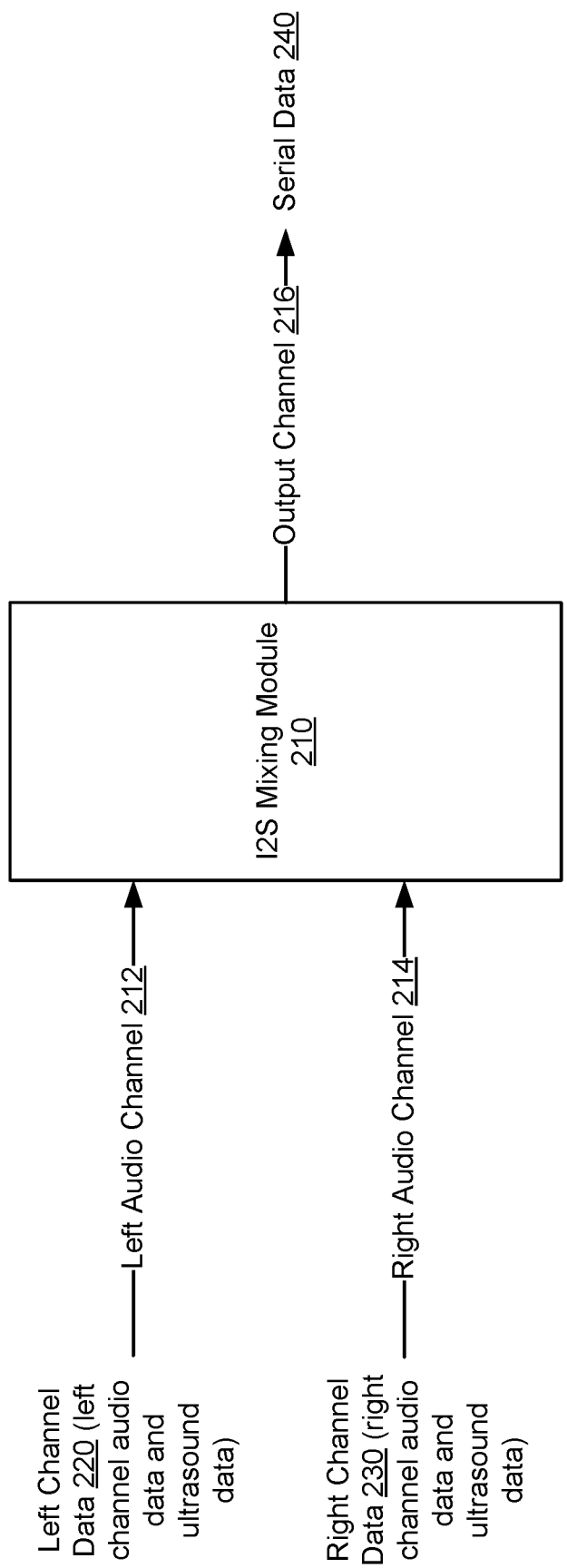
FIG. 2 illustrates an example of using an I2S mixing module to multiplex audio data and ultrasound data.

FIG. 2 illustrates an example of using an I2S mixing module 210 to multiplex audio data and ultrasound data. As illustrated, the I2S mixing module 210 has multiple inputs, including a first input coupled to a left audio channel 212 and a second input coupled to a right audio channel 214. An output of the I2S mixing module 210 is coupled to an output channel 216.

Via the left audio channel 212, the I2S mixing module 210 receives left channel data 220. The left channel data 220 includes left channel audio data from stereo audio data and further includes first ultrasound data. In other words, the left channel data 220 includes the left channel audio data and the first ultrasound data mixed together. Via the right audio channel 214, the I2S mixing module 210 receives right channel data 230. The right channel data 230 includes right channel audio data from the stereo audio data and further includes second ultrasound data. In other words, the right channel data 230 includes the right channel audio data and the second ultrasound data mixed together. The first ultrasound data and the second ultrasound data for a single ultrasound data set are sampled from an ultrasound signal, such as an ultrasound tone.

The I2S mixing module 210 outputs serial data 240 on the output channel 216. The serial data 240 includes the left channel data 220 and the right channel data 230 multiplexed together according to a timing diagram of the I2S mixing module 210. For instance, bits from the left channel data 220 and bits from the right channel data 230 are interleaved serially.

Generally, the I2S mixing module 210 implements an I2S standard, which defines a serial bus interface used for mixing input audio channels. The serial bus interface, referred to as an inter-IC sound (I2S, also sometime noted with the acronym FS) bus carries stereo audio data.

More specifically, the I2S bus is an electrical serial bus interface standard used for connecting digital audio devices together. This bus is used to communicate pulse-code modulation (PCM) audio data between integrated circuits in an electronic device. The I2S bus separates clock and serial data signals, thereby resulting in a lower jitter than is typical of communications systems that recover the clock from the data stream. For instance, the I2S bus includes a multiplexed data line for two time-multiplexed data channels, a word clock, and a bit clock, as further illustrated in the next figure.

The word clock indicates the channel being transmitted (e.g., WS=0 indicates the left audio channel and WS=1 indicates the right audio channel; WS is also referred to as WCLK). The bit clock carries the necessary clock signal. The specification of the I2S bus is defined in the "I2S bus specification," Philips Semiconductors, Jun. 5, 1996, the content of which is incorporated by reference herein in its entirety.

Accordingly, and as described in connection with FIG. 2, the ultrasound data set is split into the first ultrasound data and the second ultrasound data, each of which is mixed with left channel audio data or right channel audio data before being input to the I2S mixing module. Although such an approach can be used to ultimately transmit a waveform that carries both audio and ultrasound components, many drawbacks can exist. For example, the first ultrasound data (and, similarly, the second ultrasound data) cannot be scaled to the full digital scale because the left audio channel 212 also carries left channel audio data (and, similarly, the right audio channel 214 carries right channel audio data). Hence, the range of the ultrasound (e.g., the user presence detection range when ultrasound is used for presence detection) can be limited. Furthermore, given that the ultrasound data is not at full digital scale and given the high impedance of an audio transducer at the ultrasound frequency range, improving the range necessitates an increase to the transmission power. However, the voltage rail of a computing device implementing this approach may constrain or not even support this increase. A full digital scale represents a maximum amplitude of a signal representation in the digital domain.

Figure 3:
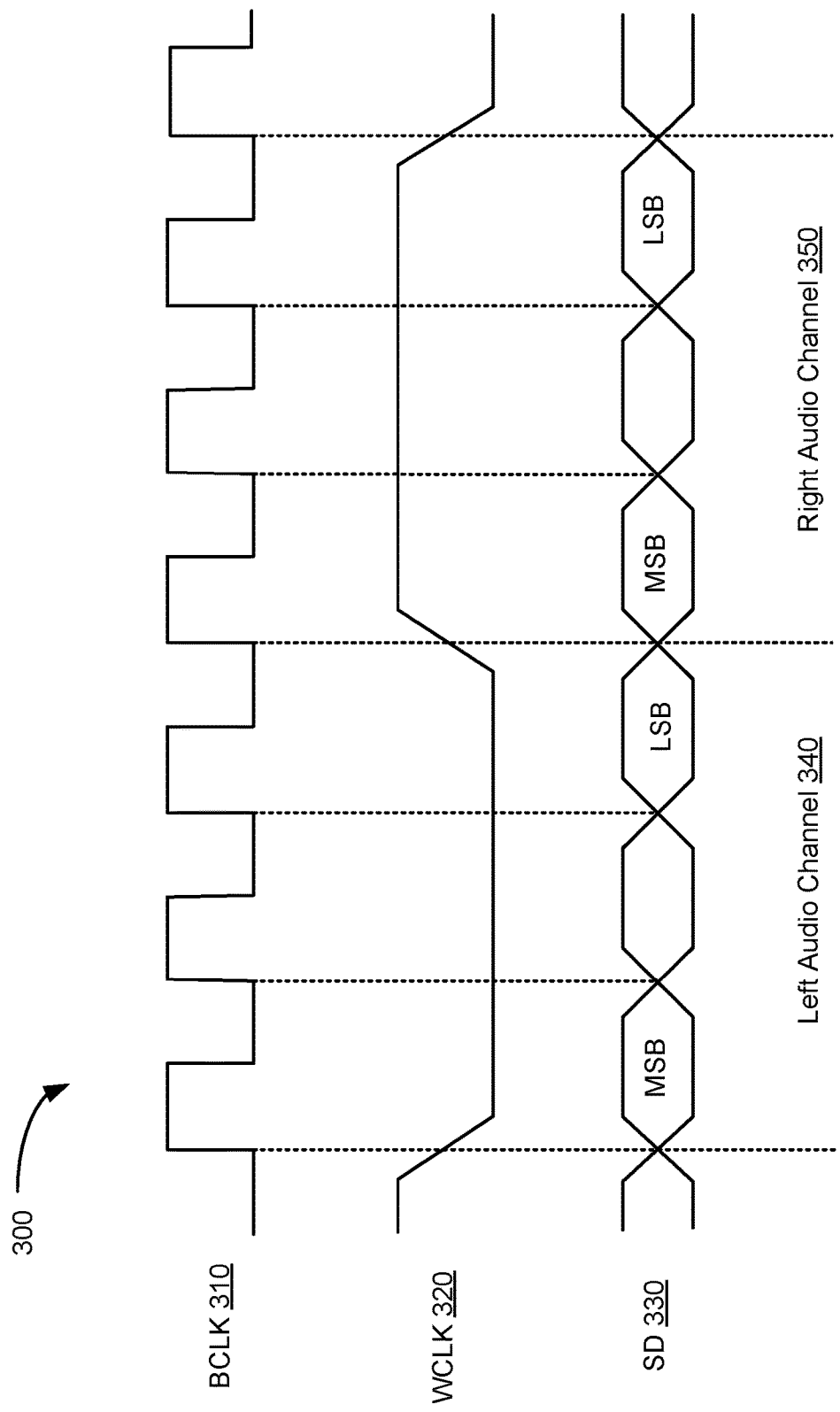
FIG. 3 illustrates an example of a timing diagram for an I2S mixing module multiplexing audio data and ultrasound data.

FIG. 3 illustrates an example of a timing diagram 300 for an I2S mixing module multiplexing audio data and ultrasound data. The timing diagram 300 can be used by the I2S mixing module 210 of FIG. 2 to output the serial data 240 based on the left channel data 220 and the right channel data 230. Generally, the I2S bus includes several lines, each of which may carry different data. These lines includes a bit clock 310 (referred to as BCLK), a word clock 320 (referred to as WCLK), and a multiplexed data line 330 (referred to as SD).

The multiplexed data line 330 multiplexes bits from the inputs to the I2S mixing module (e.g., multiplexes the left channel data 220 and the right channel data 230). The multiplexing is controlled by the bit clock 310 and the world clock 320 such that the bits are interleaved at time intervals in a serial manner. In particular, the bit clock 310 pulses once for each discrete bit of data on the inputs. The bit clock frequency is the product of the sample rate, the number of bits per input channel (e.g., the left audio channel 212 or the right audio channel 214) and the number of input channels (e.g., two). The word clock 320 indicates which of the input channels is currently being sent (e.g., if WCLK=0, then the left audio channel 212 is being transmitted; and if WCLK=1, then then the right audio channel 214 is being transmitted). Data can be signed, encoded as two's complement with the most significant bit (MSB) first and the least significant bit (LSB) last. This allows the number of bits per frame to be arbitrary, with no negotiation required between transmitter and receiver.

The multiplexing uses a fifty percent duty-cycle that has the same frequency as the sample frequency. As a result, and as illustrated in FIG. 3, the multiplexing of left channel data sent over a left audio channel 340 (e.g., the left channel data 220 over the left audio channel 212) and of right channel data sent over a right audio channel 350 (e.g., the right channel data 230 over the right audio channel 214) is symmetric in a way that the same amount of bits is carried per time interval (e.g., data throughput) and the time intervals have the same length. In other words, the multiplexed data line 330 achieves the same sample rate (and the bit rate depending on the sample precision) for both left channel data and right channel data.

Figure 4:
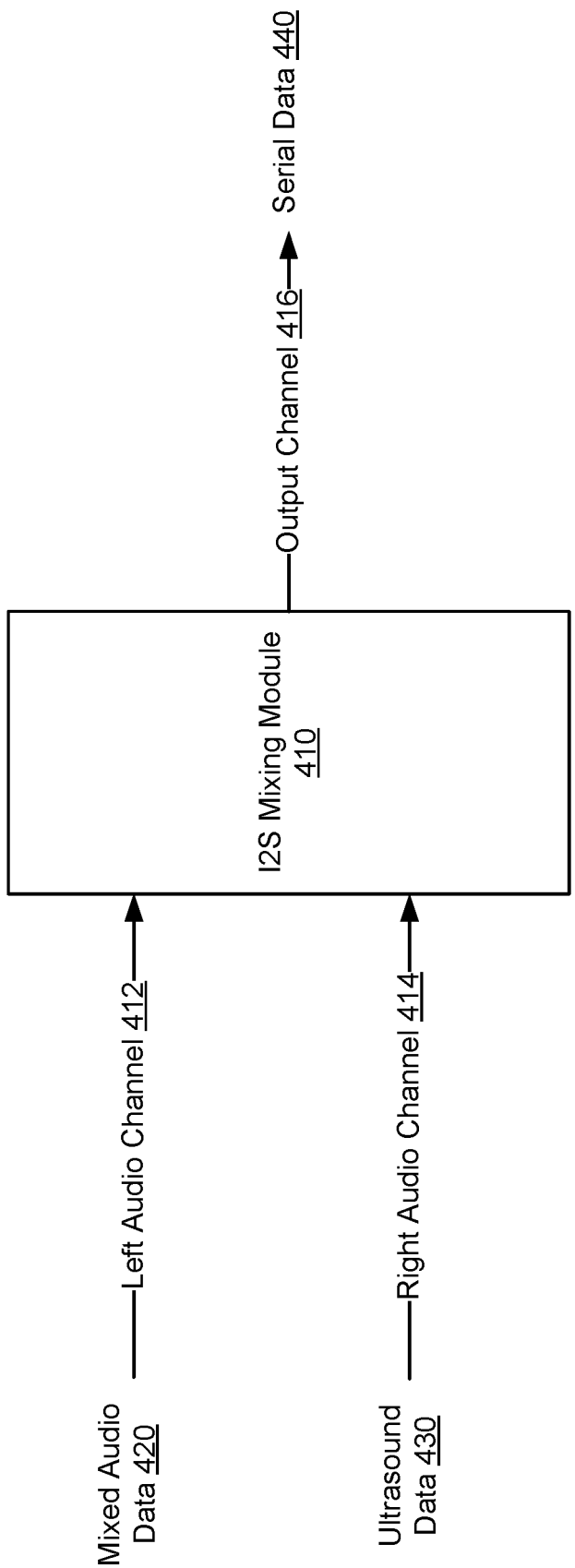
FIG. 4 illustrates another example of using an I2S mixing module to multiplex audio data and ultrasound data, according to embodiments of the present disclosure.

FIG. 4 illustrates another example of using an I2S mixing module 410 to multiplex audio data and ultrasound data, according to embodiments of the present disclosure. As illustrated, the I2S mixing module 410 has multiple inputs, including a first input coupled to a left audio channel 412 and a second input coupled to a right audio channel 414. An output of the I2S mixing module 410 is coupled to an output channel 416.

Via the left audio channel 412, the I2S mixing module 410 receives mixed audio data 420. The mixed audio data 420 includes left channel audio data and right channel audio data from stereo audio data. Generally, both the left channel audio data and the right channel audio data are sampled at a same sample rate and have a same bit rate, depending on the audio application. For instance, the sample rate is in a sample rate range between Hz and 96,000 Hz (or samples per second). The bit rate is in a bit rate range between 16 Kbps and 320 Kbps. The left channel audio data and the right channel audio data are mixed together by a digital mixer and the mixing may attenuate the overall audio. For instance, if "L" represents the left channel audio samples and "R" represents the right channel audio samples, the mixed audio data 420 corresponds to samples "S=(L+R)/2".

Via the right audio channel 414, the I2S mixing module 410 receives ultrasound data 430. The ultrasound data 430 is not mixed with audio data and can be generated from an ultrasound signal at a particular sample rate and a particular bit rate. For instance, the sample rate is in a sample rate range between 30,000 and 40,000 Hz (or samples per second). The bit rate is in a bit rate range between 16 and 320 Kbps.

The I2S mixing module 410 outputs serial data 440 on the output channel 416. The serial data 440 includes the ultrasound data 430 at a full digital scale and the mixed audio data 420 also at the full digital scale, where the ultrasound data 430 and the mixed audio data 420 are multiplexed together according to a timing diagram of the I2S mixing module 410. For instance, bits from the ultrasound data 430 and bits from the mixed audio data 420 can be interleaved serially. An example of the timing diagram is illustrated in the next figure.

Accordingly, and as described in connection with FIG. 4, the ultrasound data 430 is processed at the full digital scale. As a result, the range of the ultrasound data 430 is increased relative to the approach described in connection with FIG. 2, without necessitating an increase to the power transmission or running against the voltage rail of the computing device. In addition, the timing diagram allows flexibility in the duty cycle and the clocking and/or time intervals, such that the data throughput for the ultrasound data 430 can vary from the data throughput used for the transmitted audio and such flexibility allows additional functionalities that would not be available otherwise under the approach of FIG. 2.

Figure 5:
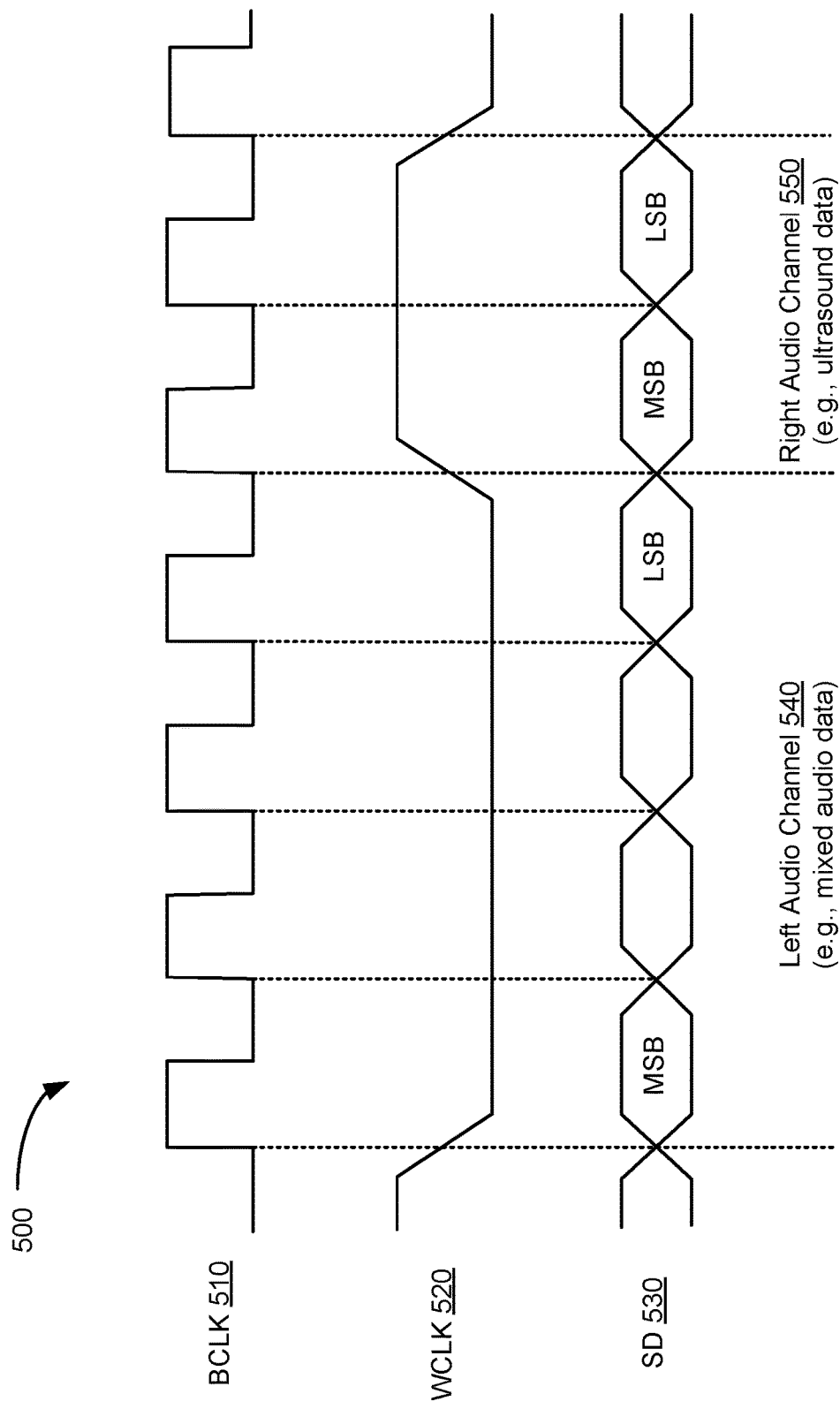
FIG. 5 illustrates another example of a timing diagram for an I2S mixing module multiplexing audio data and ultrasound data, according to embodiments of the present disclosure.

FIG. 5 illustrates another example of a timing diagram 500 for an I2S mixing module multiplexing audio data and ultrasound data, according to embodiments of the present disclosure. The timing diagram 500 can be used by the I2S mixing module 410 of FIG. 4 to output the serial data 440 based on the ultrasound data 430 and the mixed audio data 420. The I2S bus here is similar to the one described in connection with FIG. 2 (e.g., changes need not be made to the I2S bus), such that I2S bus includes several lines, each of which may carry different data. These lines includes a bit clock 510 (referred to as BCLK), a word clock 520 (referred to as WCLK), and a multiplexed data line 530 (referred to as SD).

The multiplexed data line 530 multiplexes bits from the inputs to the I2S mixing module (e.g., multiplexes the ultrasound data 430 and the mixed audio data 420). The multiplexing is controlled by the bit clock 510 and the world clock 520 such that the bits are interleaved at time intervals in a serial manner. The time intervals may, but need not, be the same to accommodate different sample rates. In particular, the bit clock 510 pulses once for each discrete bit of data on the inputs. The pules used for the ultrasound data 430 may, but also need not, have the same time length or frequency as the pulses used for the mixed audio data 420. The bit clock frequency is the product of the sample rate per input channel (e.g., the sample rate of the ultrasound data 430 and the sample rate of the mixed audio data 420), the number of bits per input channel (e.g., the bit rate of the ultrasound data 430 and the bit rate of the mixed audio data 420), and the number of input channels (e.g., two). The word clock 520 indicates which of the input channels is currently being sent (e.g., if WCLK=0, then the left audio channel 512 is being transmitted; and if WCLK=1, then the right audio channel 514 is being transmitted). Data can be signed, encoded as two's complement with the most significant bit (MSB) first and the least significant bit (LSB) last. This allows the number of bits per frame to be arbitrary, with no negotiation required between transmitter and receiver.

In one example, the multiplexing may use a fifty percent duty-cycle that has the same frequency as the sample frequency, when the sample rates and the bit rates are the same for ultrasound data 430 and the mixed audio data 420. This results in symmetric multiplexing of the ultrasound data 430 and the mixed audio data 420 to generate the serial data 440.

In another example, the multiplexing need not use a fifty percent duty-cycle. As a result, the multiplexing is not symmetric and can accommodate variable sample rates and bit rates. For instance, the mixed audio data 420 is generated at a first sample rate, and the ultrasound data 430 is generated at a second sample rate that is different from the first sample rate. In this example, the serial data 440 is generated by the I2S mixing module 510 based on the first sample rate and the second sample rate by varying the word clock 520 (e.g., by varying the time intervals corresponding to WS=0 and WS=1).

To illustrate, the first sample rate is greater than the second sample rate (e.g., 48,000 Hz compared to 30,000 Hz). The word clock 520 allocates (e.g., controls a length of) a first time interval for the mixed audio data 420 (e.g., the time between the transition from WS=1 to WS=0 and the converse transition from WS=0 to WS=1). The word clock 520 also allocates (e.g., controls a length of) a second time interval for the ultrasound data 430 (e.g., the time between the transition from WS=0 to WS=1 and the converse transition from WS=1 to WS=0). In this illustration, the first time interval is longer than the second time interval based on the first sample rate being greater than the second sample rate, such that a greater number of audio bits can be transmitted relative to a number of ultrasound bits within a duty cycle (e.g., the cycle starting at the beginning of the first time interval and finishing at the end of the second time interval).

In addition, the bit clock 510 can be adjusted based on the first sample rate and/or a first bit rate of the mixed audio data 520 and/or the second sample rate and/or a second bit of the ultrasound data 530. To illustrate, the first bit rate is greater than the second bit rage (e.g., 96 Kbps compared to 16 Kbps). In this illustration, during the first time interval (e.g., WS=0 and the mixed audio data 420 is being multiplexed on the multiplexed data line 530), the bit clock 510 can be changed (e.g., the pulse can be shortened in time or its frequency can be increased) to allow for the greater bit rate. In comparison, during the second time interval (e.g., WS=1 and the ultrasound data 430 being multiplexed on the multiplexed data line 530), the bit clock 510 can be changed again (e.g., the pulse can be lengthened in time or its frequency can be decreased) to allow for the greater bit rate.

Accordingly, and as illustrated in connection with FIGS. 4-5, embodiments of the present disclosure involve re-purposing one of the two input channels to the I2S mixing module (e.g., the right audio channel as described in connection with these two figures). The embodiments also allow the processing of the ultrasound data 430 at full digital scale without necessitating additional power and provide a flexibility to adjust for sample rates and bit rates that may differ between the ultrasound data 430 and the stereo audio data.

Figure 6:
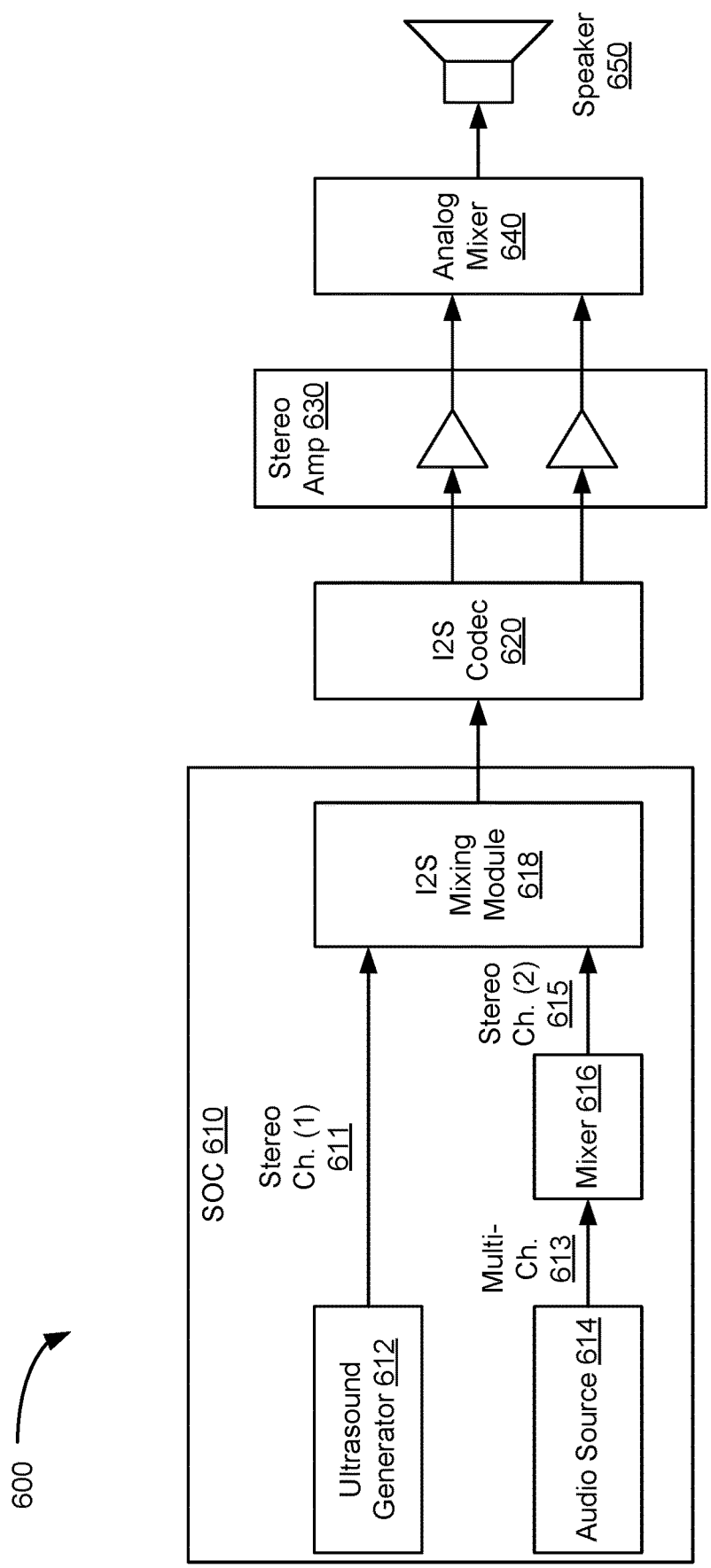
FIG. 6 illustrates an example of an architecture of an audio system of a computing device that transmits an audio signal and an ultrasound signal concurrently, according to embodiments of the present disclosure.

FIG. 6 illustrates an example of an architecture of an audio system 600 of a computing device that transmits an audio signal and an ultrasound signal concurrently, according to embodiments of the present disclosure. The audio system 600 is an example of the audio system 111 of FIG. 1 and implements the I2S approach described in connection with FIGS. 4-5.

Generally, the architecture of the audio system 600 reuses an existing acoustical transducer for audio-ultrasound concurrency without compromising either audio or ultrasound energy. In particular, the audio system 600 mixes a multi-channel audio file into one channel that becomes the left or right channel for I2S. The second channel in I2S is re-purposed for the ultrasound. For example, the audio can be recorded into the left channel in I2S and the ultrasound can be recorded into the right channel, or vice versa to form the data line. The data line is then sent to a codec that is compliant with the I2S standard. The codec decomposes the data line into two dedicated ultrasound and audio channels, each of which is sent separately to the stereo amplifier downstream. The amplifier provides the separate amplification defined by power voltage drain drain (PVDD) of the audio system 600 (or more generally the computing device), and the analog ultrasound and the analog audio signal are sent to an analog mixing circuitry. In this stage, the two analog signals are combined and superimposed electrically. With this approach, no audio nor ultrasound energy are compromised digitally to avoid signal clipping at the audio amplifier voltage rail, and the peak voltage delivered at acoustical transducer terminal could exceed the PVDD. This approach has many significant benefits to home and mobile devices, which are limited by power supply voltage rail or battery power supply.

In an example, the audio system 600 includes a system on chip 610, also referred to as an SOC, an I2S codec 620, a stereo amplifier 630, an analog mixer 640, and a speaker 650. The system on chip 610 provides digital processing of audio and ultrasound (e.g., processing in the digital domain of audio data and ultrasound data, each of which includes bits). In comparison, remaining components 620-650 of the audio system 600 provider operations on the audio and ultrasound in the analog domain (e.g., perform analog operations on the audio signal and the ultrasound signal). As used herein, "data" refers to a digital representation, whereas "signal" refers to an analog representation. Mixed audio data can be referred to herein as mixed digital audio data to indicate that this data represents audio in the digital domain. Conversely, mixed audio signal can be referred to herein as mixed analog audio signal to indicate that this signal represents audio in the analog domain. Similarly, ultrasound data can be referred to herein as digital ultrasound data to indicate that this data represents ultrasound in the digital domain. Conversely, ultrasound signal can be referred to herein as analog ultrasound signal to indicate that this signal represents ultrasound in the analog domain. An output signal can be referred to as an output analog signal to indicate that this signal represents an output in the analog domain. The system on chip 610 and the remaining components 620-650 of the system on chip 610 are powered from a direct current (DC) power source including any of a battery or a power charger. The input voltage can be in the range of, for instance, five volts to twenty-four volts. Given the DC power source, the system on chip 610 can have a voltage rail.

The system on chip 610 can be an integrated circuit (also known as a "chip") that integrates different computing components. In addition to the computing components 612-618 shown in FIG. 6, the system on chip's 610 computing components include central processing unit (CPU), a digital signal processor (DSP), a memory, input/output ports and secondary storage. The different components can be inter-connected on a single substrate or microchip. The system on chip 610 can be fabricated using metal-oxide-semiconductor (MOS) technology, and can be embedded in the computing device.

As illustrated in FIG. 6, the system on chip 610 includes an ultrasound generator 612, an audio source 614, a digital mixer 616, and an I2S mixing module 618. The ultrasound generator 612 and the I2S mixing module are coupled with a first stereo channel 611 (e.g., the right audio channel 550 of FIG. 5). In particular, the output of the ultrasound generator 612 is coupled to one of the inputs of the I2S mixing module 618 via the first stereo channel 611. In comparison, the audio source 614 and the digital mixer 616 are coupled with multiple audio channels 613, and the digital mixer 616 and the I2S mixing module 618 are coupled with a second stereo channel 615 (e.g., the left audio channel 540 of FIG. 5). In particular, each of the outputs of the audio sources is coupled to one of the inputs of the digital mixer 612 via a separate one of the with multiple audio channels 613. The output of the digital mixer 616 is coupled to another one of the inputs of the I2S mixing module 618 via the second stereo channel 615.

In an example, the ultrasound generator 612 is any or a combination of a digital signal processor or a central processing unit. In operation, the ultrasound generator 612 generates ultrasound data that represents an ultrasound tone, an ultrasound chirp, or some other ultrasound waveform. The ultrasound data can be generated at a sample rate in a sample rate range between 30,000 and 40,000 Hz (or samples per second). The ultrasound data can also have a bit rate in a bit rate range between 16 and 320 Kbps.

In an example, the audio source 614 represents an audio file system that stores audio files in different formats, including a stereo format. Alternatively or additionally, the audio source 614 can be an application framework that streams such audio files, but from one or more audio file systems that are not local to the audio system 600 and that can be remote to the computing device and accessible to the computing device over a data network or an audio bus (e.g., an I2S bus). Accordingly, the audio source 614 outputs sets of audio data, each set being an output on a separate audio channel of the multiple audio channels 613. For instance, in the case of stereo audio, the audio source 614 outputs left channel audio data "L" on one audio channel of the multiple audio channels 613 and right channel audio data "R" on another audio channel of the multiple audio channels 613. Each of the left channel audio data "L" and the right channel audio data "R" is output at a sample rate in a sample rate range between 48,000 and 96,000 Hz (or samples per second). Further, each of the left channel audio data "L" and the right channel audio data "R" has a bit rate in a bit rate range between 16 and 320 Kbps. Of course, more than two sets of audio data can be output by the audio source 614 depending on the audio file and relevant audio application. For instance, the audio source 614 can output audio data representing surround sound 4.0 that uses four audio channels, surround sound 5.1 that uses six audio channels, or surround sound 7.1 that uses eight audio channels.

In an example, the digital mixer 616 combines, routes, and changes the dynamics, equalization and other properties of the audio inputs (e.g., the sets of audio data that are output from the audio source 614). For instance, the sets of audio data are summed and, possibly, attenuated to produce mixed audio data onto the second stereo channel 615. Referring back to the example of stereo audio with the left channel audio data "L" and the right channel audio data "R", the mixed audio data corresponds to "S=(L+R)/2". In this case, each of the left audio data "L" and the right audio data "R" is attenuated by three decibels, for a total attenuation of six decibels. Of course, and as mentioned above, the audio inputs are not limited to stereo and can include other audio formats (e.g., any of surround sound 4.0, 5.1, or 7.1). Generally, if "$A_i$" represents audio data on one audio channel of the multiple audio channels 613, and if the total number of the multiple audio channels 613 is "N," the mixed audio data corresponds to "$S=(\Sigma_{i=1}^{i=N} A_i)/N$".

In an example, the I2S mixing module 618 implements an I2S standard. In particular, the I2S mixing module multiplexes the ultrasound data that is output by the ultrasound generator 612 and that is received over the first stereo channel 611 and the mixed audio data that is output by the digital mixer 616 and that is received over the second stereo channel 615. The multiplexing can use a timing diagram, such as the timing diagram 500 of FIG. 5 and can depend on a bit clock (BCLK) and word clock (WCLK) of the I2S mixing module 618. The output of I2S mixing module 618 is serial data, representing the multiplexing of the ultrasound data and the mixed audio data. The serial data is output on a multiplex data line that is coupled with the I2S codec 620.

In an example, each one of the audio channels 611, 613, and 615 represents an audio signal communications channel that carries audio data. An audio signal communications channel can be implemented as a data line that carries the corresponding audio data as an electrical signal taking one of different possible discrete values. Generally, each set of audio data can be sent on an audio signal communications channel.

In an example, the I2S codec 620 is a coder-decoder that is compatible with the I2S standard and that outputs the ultrasound signal and the mixed audio signal based on the serial data that is input to the I2S codec 620. For instance, the I2S codec 620 can be implemented in hardware that decodes digital data back into analog signals. In particular, the I2S codec 620 includes a digital-to-analog converter (DAC) running off the same clock signals as the I2S mixing module 618 and that converts the serially PCM multiplexed data into the ultrasound signal and the mixed audio signal. The I2S codec 620 sends the ultrasound signal over a first analog line to the stereo amplifier 630, and sends the mixed audio signal over a second analog line to the stereo amplifier 630. In an example and referring back to the example of FIG. 5, the I2S mixing module 618 clock signals (e.g., BCLK and/or WCLK) can be adjusted to account for sample rates that vary between the mixed audio data and the ultrasound data. In this example, the clock signals of the I2S codec 620 can also be adjusted in a same way to enable the proper decoding. To illustrate, WCLK of the I2S mixing module 618 is increased for the mixed audio data and decreased for the ultrasound data given that the mixed audio data has a greater sample rate. Likewise, the WCLK of the I2S coded 620 is increased for decoding and outputting the mixed audio signal and decreased for decoding and outputting the ultrasound signal.

In an example, the stereo amplifier 630 includes two audio amplifiers: a first audio amplifier for the right audio channel and a second audio amplifier for the left audio channel. Here, because the ultrasound signal is one of the audio channels (e.g., the right audio channel), one of the first audio amplifier or the second audio amplifier (e.g., the first audio amplifier in the case where the ultrasound signal is on the right audio channel) amplifies the ultrasound signal and the other audio amplifier (e.g., the second audio amplifier) amplifies the mixed audio signal. Because two different audio amplifiers are used, the ultrasound signal can be amplified according to a first amplification gain, and the mixed audio signal can be amplified according to a second amplification gain. The first amplification gain and the second amplification gain can be different from each other. In particular, to maximize the range of the ultrasound signal (e.g., the user presence detection range), the first amplification gain can be set to a maximum amplification gain of the stereo amplifier 630. Generally, amplification of at least the ultrasound signal occurs in a stage prior to the analog mixing by the analog mixer 640 to account for any voltage rail constraint of the audio system 600.

Generally, an audio amplifier (e.g., any of the first audio amplifier or the second audio amplifier) is an electronic amplifier that amplifies low-power electronic signal (ultrasound or audio, as applicable), into a signal that has a high enough power for the speaker 650. The audio amplifier can also perform other functionalities on the low-power electronic signal such as equalization (e.g., adjusting the bass and treble) and tone controls.

In an example, the analog mixer 640 mixes the ultrasound signal, as amplified (e.g., referred to herein also as an amplified ultrasound signal), and the mixed audio signal, as amplified (e.g., referred to herein also as an amplified mixed audio signal), in the analog domain to generate an output signal. For instance, the analog mixer 640 combines the ultrasound signal with the mixed audio signal, each as amplified, by summing the analog voltages representing each of the two signals. Accordingly, the output signal is an electrical signal containing both ultrasound components and audio components. In particular, the output signal includes a superimposition of the ultrasound signal, as amplified, over the mixed audio signal, as amplified.

In an example, the speaker 650 presents a waveform in response to the output signal. For instance, the speaker 650 includes an acoustic transducer that produces the waveform given the analog voltage of the output signal. The waveform can include acoustic waves that are transmitted through the air. The acoustic waves contain waves in the audible frequency range (e.g., 20 to 20,000 Hz) corresponding to the audio and contain waves in the ultrasound frequency range (e.g., larger than 20,000 Hz) corresponding to the ultrasound.

Although the use of multiple amplifications, such as one for the analog ultrasound signal and one for the analog mixed audio signal, a single amplification can be used. In this case, both analog ultrasound signal and one for the analog mixed audio signal are amplified by a single amplification gain in case when the audio system (e.g., the audio system 110 of FIG. 1 or the audio system 600 of FIG. 6) has one amplification gain for the different audio channels. Under this case, the ultrasound data need not be processed at full scale of the digital domain, but can be processed at less than the full scale, such as at a faction of the full scale (e.g., half).

Figure 7:
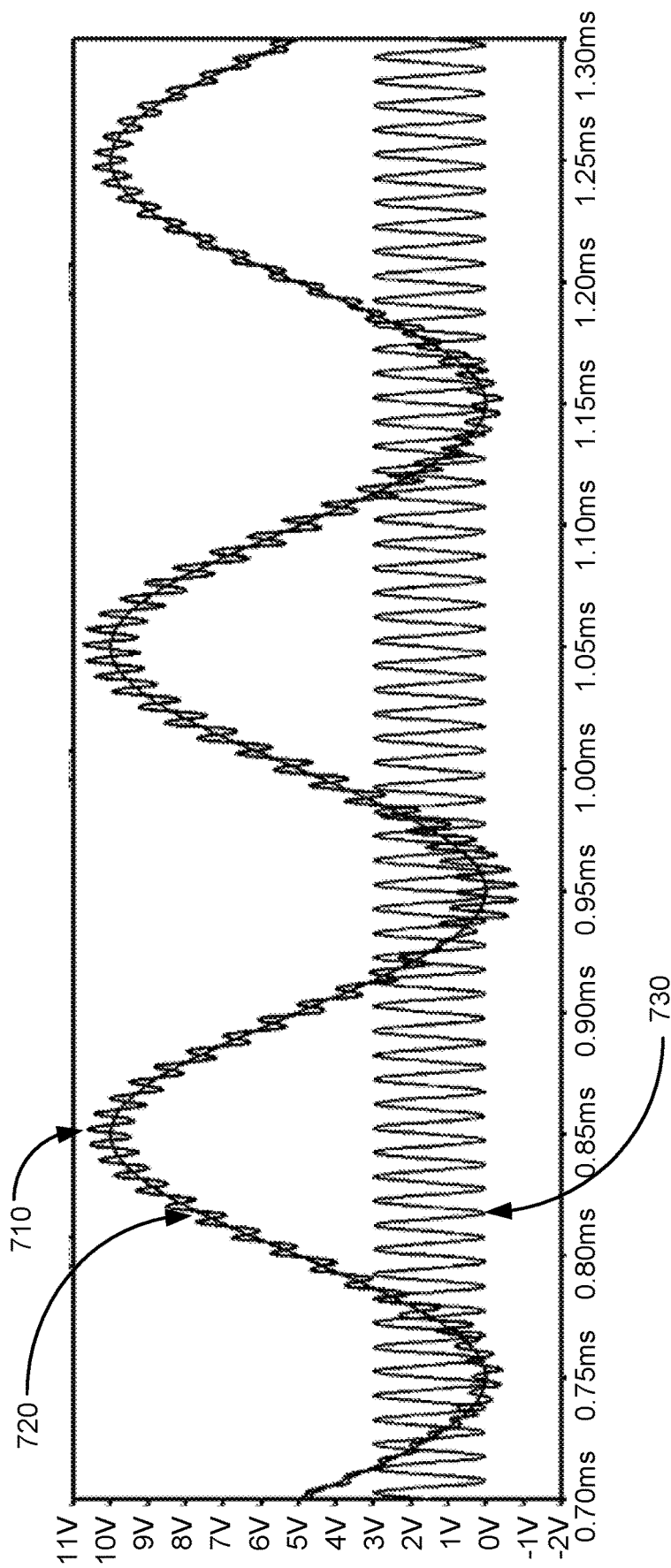
FIG. 7 illustrates an example of an output signal carrying audio and ultrasound components, according to embodiments of the present disclosure.

FIG. 7 illustrates an example of an output signal 710 carrying audio and ultrasound components, according to embodiments of the present disclosure. The output signal 710 is illustrated with voltage values (the vertical axis) over time (the horizontal axis). The output signal 710 can be generated by an analog mixer, such as the analog mixer 640 of FIG. 6. The maximum voltage of the output signal 710 is less than eleven volts, whereas the voltage rail of a computing device outputting this output signal 710 is greater than eleven volts (e.g., twelve volts DC). Also illustrated in FIG. 7 are a mixed audio signal 720 and an ultrasound signal 730. Each of the mixed audio signal 720 and the ultrasound signal 730 can be output from a separate audio amplifier of a stereo amplifier, such as the stereo amplifier 630 of FIG. 6.

Whereas the mixed audio signal 720 varies in voltage between zero and ten volts, and whereas the ultrasound signal 730 varies between zero and three volts, the output signal varies between zero volts and about, but less than, eleven volts (e.g., rather than between zero and thirteen volts).

The frequency of the mixed audio signal 720 is about 1/0.2 ms or 5,000 Hz. The frequency of the ultrasound signal is about 1/0.01 ms or 100,000 Hz. The frequency components of these two signal 720 and 730 are preserved in the output signal 710, as shown with the global wave shape of the output signal 710 following the wave shape of the mixed audio signal 720, and as shown with the local wave shape superimposed over this global wave shape and following the wave shape of the ultrasound signal 730. Given the different frequency bands (e.g., 5,000 Hz and 100,000 Hz) of the components carried by the output signal 710, interference between the ultrasound and the audio likely does not exist.

Figure 8:
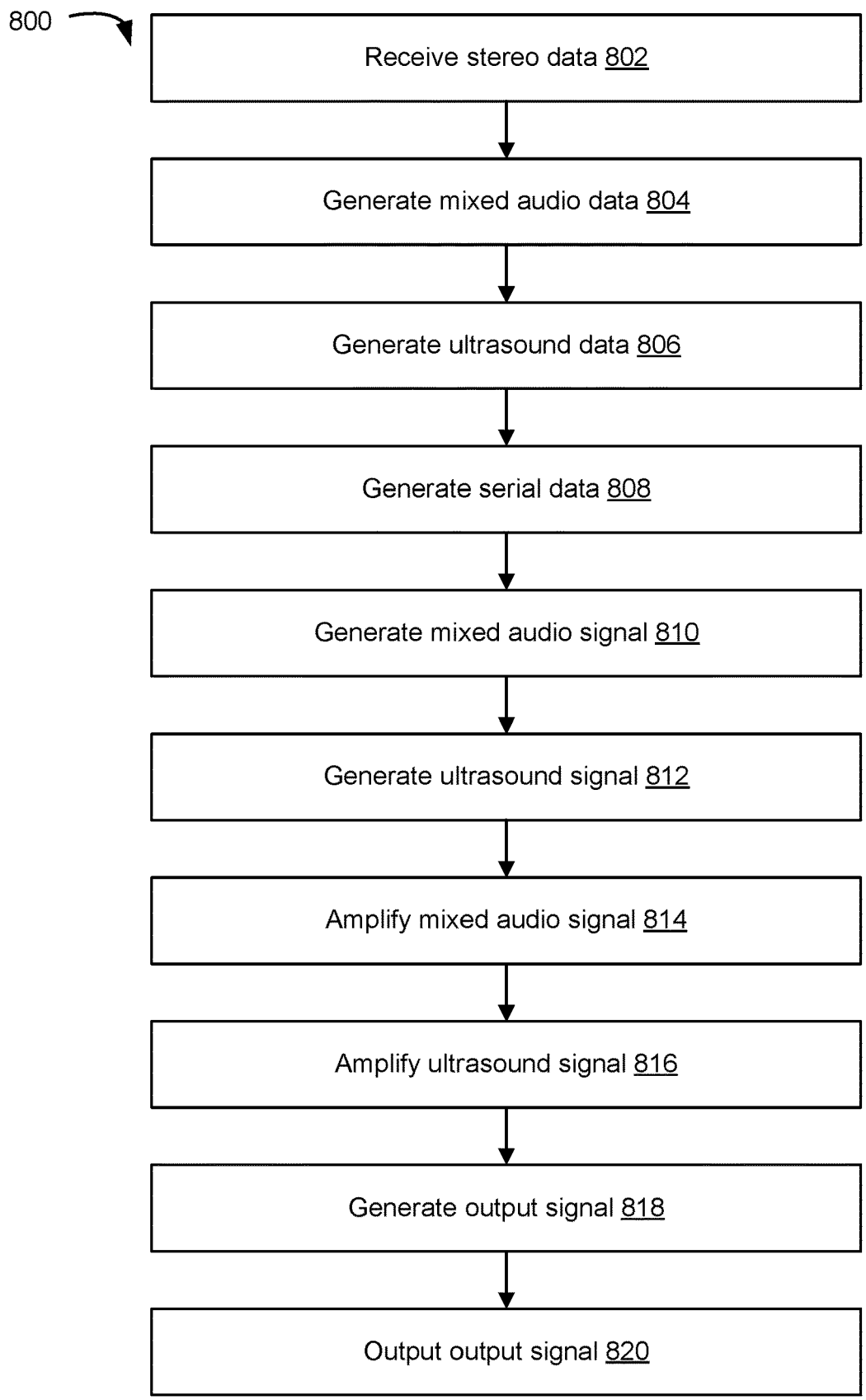
FIG. 8 illustrates an example of a flow for concurrent transmission of an audio signal and an ultrasound signal, according to embodiments of the present disclosure.

FIG. 8 illustrates an example of a flow 800 for concurrent transmission of an audio signal and an ultrasound signal, according to embodiments of the present disclosure. The flow 800 can be implemented on a computing device that includes an audio system, such as the computing device 110 of FIG. 1 including the audio system 111 of FIG. 1 or the audio system 600 of FIG. 6. Instructions for performing the operations can be implemented with specific hardware circuitry and/or as computer-readable instructions stored on non-transitory computer-readable media of the computing device. As stored, the instructions represent programmable modules that include code executable by a processor and/or hardware circuitry of the computing device. The execution of such instructions configures the computing device to perform the specific operations shown in the figure and described herein. Each programmable module in combination with the respective processor and/or hardware circuitry represents a means for performing a respective operation(s). While the operations are illustrated in a particular order, it should be understood that no particular order is necessary and that one or more operations may be omitted, skipped, performed in parallel, and/or reordered.

In an example, the flow 800 includes operation 802, where the computing device receives stereo data. For instance, the computing device includes an audio source, such as the audio source 614 of FIG. 6. The audio source generates, in a digital domain, right channel audio data and left channel audio data. The right channel audio data and the left channel audio data collectively represent the stereo audio data. The stereo audio data can be generated at a first sample rate and can have a first bit rate.

In an example, the flow 800 includes operation 804, where the computing device generates mixed audio data. For instance, the computing device includes a digital mixer, such as the digital mixer 616 of FIG. 6. The digital mixer mixes, in the digital domain, the right channel audio data and the left channel audio data to generate and output the mixed audio data. In particular, if "L" represents the left channel audio samples and "R" represents the right channel audio samples, the mixed audio data corresponds to samples "S=(L+R)/2". The mixed audio data can be generated at the first sample rate and can have the first bit rate.

In an example, the flow 800 includes operation 806, where the computing device generates ultrasound data. For instance, the computing device includes an ultrasound generator, such as the ultrasound generator 612 of FIG. 6. The ultrasound generator generates, in the digital domain, the ultrasound data at a second sample rate. The ultrasound data can have a second bit rate. The first sample rate can be greater than the second sample rate. The first bit can also be greater than the second bit rate.

In an example, the flow 800 includes operation 808, where the computing device generates serial data. For instance, the mixed audio data and the ultrasound data are input to an I2S mixing module of the computing device, such as the I2S mixing module 618 of FIG. 6. The I2S mixing module multiplexes the ultrasound data and the mixed audio data according to a timing diagram, such as the timing diagram 500 of FIG. 5 to generate the serial data. The timing diagram 500 includes a bit clock (BCLK) and a word clock (WCLK). Any or both of the bit clock and word clock can be set as a function of the first sample rate, the second sample rate, the first bit rate, and/or the second bit rate.

In an example, the flow 800 includes operation 810, where the computing device generates a mixed audio signal based on the serial data. For instance, the serial data can be output from the I2S mixing module and input to an I2S coder-decoder (codec) of the computing device, such as the I2S codec 620 of FIG. 6. The I2S coder-decoder decodes the serial data according to the same timing diagram and outputs the mixed audio signal as an analog representation of the mixed audio data multiplexed in the serial data.

In an example, the flow 800 includes operation 812, where the computing device generates an ultrasound signal based on the serial data. For instance, the serial data can be output from the I2S mixing module and input to the I2S coder-decoder. In turn, the I2S coder-decoder decodes the serial data according to the same timing diagram and outputs the ultrasound signal as an analog representation of the ultrasound data multiplexed in the serial data.

In an example, the flow 800 includes operation 814, where the computing device amplifies the mixed audio signal. For instance, the computing device includes a stereo amplifier, such as the stereo amplifier 630 of FIG. 6. The mixed audio signal can be output from the I2S coder-decoder and input to one of the audio amplifiers of the stereo amplifier. This audio amplifier amplifies the mixed audio signal according to a first amplification gain.

In an example, the flow 800 includes operation 816, where the computing device amplifies the ultrasound signal. For instance, the ultrasound signal can be output from the I2S coder-decoder and input to another one of the audio amplifiers of the stereo amplifier. This audio amplifier amplifies the ultrasound signal according to a second amplification gain. The first amplification gain and the second amplification gain can be different from each other and/or tuned independently of each other. For instance, the second amplification gain can be set to a maximum amplification gain to increase the range of the ultrasound signal. The first amplification gain can be set based on a user setting for a loudness of the mixed audio signal.

As explained herein above, a single amplification can be used. In this case, operations 814 and 816 can be combined. Further, the ultrasound data under the above operations can be processed at less than the full scale of the digital domain (e.g., generated at less than the full scale under operation 804).

In an example, the flow 800 includes operation 818, where the computing device generates an output signal based on the mixed audio signal and the ultrasound signal. For instance, the computing device includes an analog mixer, such as the analog mixer 640 of FIG. 6. After amplification of each of the mixed audio signal and the ultrasound signal as applicable, the mixed audio signal and the ultrasound signal, each as amplified, are output from the stereo amplifier and input to the analog mixer. The analog mixer combines the mixed audio signal and the ultrasound signal to generate the output signal.

In an example, the flow 800 includes operation 820, where the computing device outputs the output signal, such as by presenting the output signal. For instance, the output signal is sent from the analog mixer to a speaker. The speaker may, but need not, be a component of the computing device. The speaker generates and outputs a waveform that represents the output signal. The waveform includes audible waves and acoustic waves.

Figure 9:
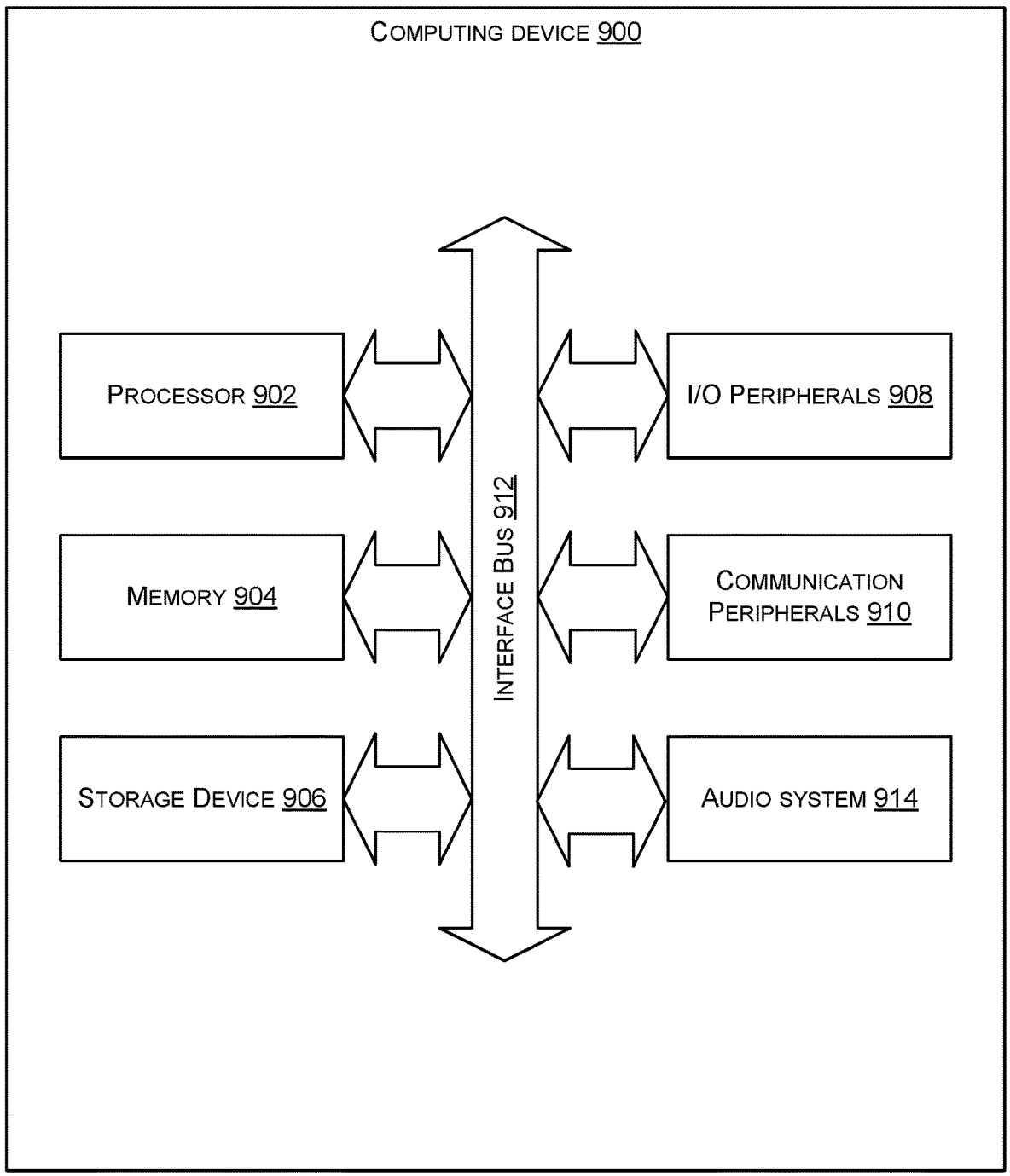
FIG. 9 illustrates an example of an architecture of a computing device that includes an audio system, according to embodiments of the present disclosure.

FIG. 9 illustrates an example of an architecture of a computing device that includes an audio system, according to embodiments of the present disclosure. The computing device 900 is an example of the computing device 110 of FIG. 1. Although the components of the computing device 900 are illustrated as belonging to a same computing device 900, the computing device 900 can also be distributed (e.g., between multiple user devices).

The computing device 900 includes at least a processor 902, a memory 904, a storage device 906, input/output peripherals (I/O) 908, communication peripherals 910, an interface bus 912, and an audio system 914. The audio system 914 is an example of the audio system 111 of FIG. 1 and/or the audio system 600 of FIG. 6. The interface bus 912 is configured to communicate, transmit, and transfer data, controls, and commands among the various components of the computing device 900. The memory 904 and the storage device 906 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing device 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing device of, for example, a cloud network or a data center. The I/O peripherals 908 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 908 are connected to the processor 902 through any of the ports coupled to the interface bus 912. The communication peripherals 910 are configured to facilitate communication between the computing device 900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A method implemented on a device, the method comprising:

receiving, in a digital domain, stereo audio data that comprises left channel audio data and right channel audio data;

generating, in the digital domain, mixed audio data by mixing the left channel audio data and the right channel audio data according to "S=(L+R)/2," wherein "S" represents the mixed audio data, "L" represents the left channel audio data, and "R" represents the right channel audio data;

generating, in the digital domain, ultrasound data representing an ultrasound tone;

generating, by an inter-IC sound (I2S) mixing module of the device implementing an I2S protocol, serial data, the serial data generated by inputting the mixed audio data via a first channel to the I2S mixing module and inputting the ultrasound data via a second channel to the I2S mixing module;

generating using the serial data, a mixed analog audio signal and an analog ultrasound signal;

generating an output analog signal by summing a voltage of the mixed analog audio signal and a voltage of the analog ultrasound signal; and outputting, by a speaker of the device, the output analog signal.

2. The method of claim 1, wherein the ultrasound data is generated at a full digital scale in the digital domain, wherein the mixed audio data is generated at the full digital scale in the digital domain by mixing the left channel audio data and the right channel audio data each at a half of the full digital scale, wherein the full digital scale represents a maximum amplitude of a signal representation in the digital domain.

3. The method of claim 1, further comprising:

amplifying, by a first amplifier of the device, the mixed analog audio signal by a first gain value to generate an amplified mixed analog audio signal; and amplifying, by a second amplifier of the device, the analog ultrasound signal by a second gain value, to generate an amplified analog ultrasound signal, and wherein generating the output analog signal comprises mixing the amplified mixed analog audio signal and the amplified analog ultrasound signal.

4. A device comprising:

one or more processors; and one or more memories storing computer-readable instructions that, upon execution by the one or more processors, configure the device to:

generate, in a digital domain, mixed audio data from multiple sets of audio data, each set corresponding to a different audio channel;

generate, in the digital domain, ultrasound data;

generate serial data by providing the mixed audio data and the ultrasound data as different inputs to an inter-IC sound (I2S) mixing module;

generate, in an analog domain, an output signal based at least in part on the serial data; and send the output signal to a speaker.

5. The device of claim 4, wherein the one or more memories store additional computer-readable instructions that, upon execution by the one or more processors, further configure the device to:

generate, in the analog domain, a mixed audio signal and an ultrasound signal by inputting the serial data to an I2S coder-decoder (codec) of the device, wherein the output signal is generated by at least mixing the mixed audio signal and the ultrasound signal.

6. The device of claim 4, wherein the mixed audio data is generated at a first sample rate and the ultrasound data is generated at a second sample rate that is different from the first sample rate, and wherein the serial data is generated based at least in part on the first sample rate and the second sample rate.

7. The device of claim 6, wherein the serial data is generated by serially multiplexing the mixed audio data and the ultrasound data based at least in part on a word clock (WCLK) of the I2S mixing module, and wherein the WCLK is based at least in part on the first sample rate and the second sample rate.

8. The device of claim 6, wherein the first sample rate is greater than the second sample rate, wherein a word clock (WCLK) of the I2S mixing module controls a first time interval for the mixed audio data and a second time interval for the ultrasound data, and wherein the first time interval is longer than the second time interval.

9. The device of claim 4, wherein the ultrasound data is generated at a sample rate, and wherein the serial data is generated by serially multiplexing the mixed audio data and the ultrasound data based at least in part on a bit clock (BCLK) of the I2S mixing module, and wherein the BCLK is based at least in part on the sample rate.

10. The device of claim 4, wherein the output signal is generated based at least in part on an I2S coder-decoder, wherein the mixed audio data is generated at a first sample rate and the ultrasound data is generated at a second sample rate that is different from the first sample rate, wherein a clock of the I2S mixing module is defined based at least in part on the first sample rate and the second sample rate, and wherein a clock of the I2S coder-decoder is defined to be the same as the clock of the I2S mixing module.

11. The device of claim 4, wherein the ultrasound data is generated at less than a full digital scale in the digital domain, and wherein the one or more memories store additional computer-readable instructions that, upon execution by the one or more processors, further configure the device to:
generate, in the analog domain, a mixed audio signal and an ultrasound signal based at least in part on the serial data; and
amplify the mixed audio signal and ultrasound signal by a gain to generate an amplified mixed audio signal and an amplified ultrasound signal, wherein generating the output signal comprises mixing the amplified mixed audio signal and the amplified ultrasound signal.

12. The device of claim 4, wherein the one or more memories store additional computer-readable instructions that, upon execution by the one or more processors, further configure the device to:
generate, in the analog domain, an ultrasound signal based at least in part on the serial data; and
amplify the ultrasound signal by an amplification gain, wherein the ultrasound data is generated at a digital scale in the digital domain, and wherein at least one of the digital scale or the amplification gain is based at least in part on a user presence detection range.

13. A system comprising:
a speaker;
one or more processors; and
one or more memories storing computer-readable instructions that, upon execution by the one or more processors, configure the system to:
generate, in a digital domain, mixed audio data from multiple sets of audio data, each set corresponding to a different audio channel;
generate, in the digital domain, ultrasound data;
generate serial data by providing the mixed audio data and the ultrasound data as different inputs to an inter-IC sound (I2S) mixing module;
generate, in an analog domain, an output signal based at least in part on the serial data; and
send the output signal to the speaker.

14. The system of claim 13, wherein the system further comprises a system on chip, wherein the system on chip comprises at least one of a digital signal processor (DSP) or a central processing unit configured to generate the ultrasound data, wherein the system on chip further comprises the I2S mixing module, and wherein the at least one DSP or the central processing unit is coupled with the I2S mixing module via a first audio channel.

15. The system of claim 14, wherein the system on chip further comprises an audio source configured to output the multiple sets of audio data, wherein the system on chip further comprises a digital mixer that is coupled with the audio source via multiple audio channels and that is coupled with the I2S mixing module via a second audio channel.

16. The system of claim 13, wherein the system further comprises an I2S coder-decoder (codec) that is coupled with the I2S mixing module and that is configured to output a mixed audio signal and an ultrasound signal based at least in part on the serial data, and wherein the system further comprises an analog mixer configured to mix the mixed audio signal and the ultrasound signal.

17. The system of claim 16, wherein the system further comprises a first amplifier that is configured to receive the mixed audio signal from the I2S codec and output an amplified mixed audio signal to the analog mixer, and wherein the system further comprises a second amplifier that is configured to receive the ultrasound signal from the I2S codec and output an amplified ultrasound signal as amplified to the analog mixer.

18. The system of claim 13, wherein the mixed audio data is generated from stereo audio data that comprises left channel audio data and right channel audio data, and wherein the mixed audio data is generated at a full digital scale in the digital domain.

19. The system of claim 13, wherein the one or more memories store additional computer-readable instructions that, upon execution by the one or more processors, further configure the system to:
receive, in the digital domain, at least three sets of audio data corresponding to at least three audio channels, wherein the mixed audio data is generated by a digital mixer that has at least three inputs corresponding to the at least three audio channels.

20. The system of claim 13, wherein the sets of audio data represent audio content, wherein the ultrasound data represents ultrasound content, and wherein sending the output signal to the speaker causes the speaker to output the audio content and the ultrasound content.

* * * * *